3 Sheets—Sheet 1.

C. W. GREEN & M. T. HOWLAND.
Potato-Digger.

No. 207,175. Patented Aug. 20, 1878.

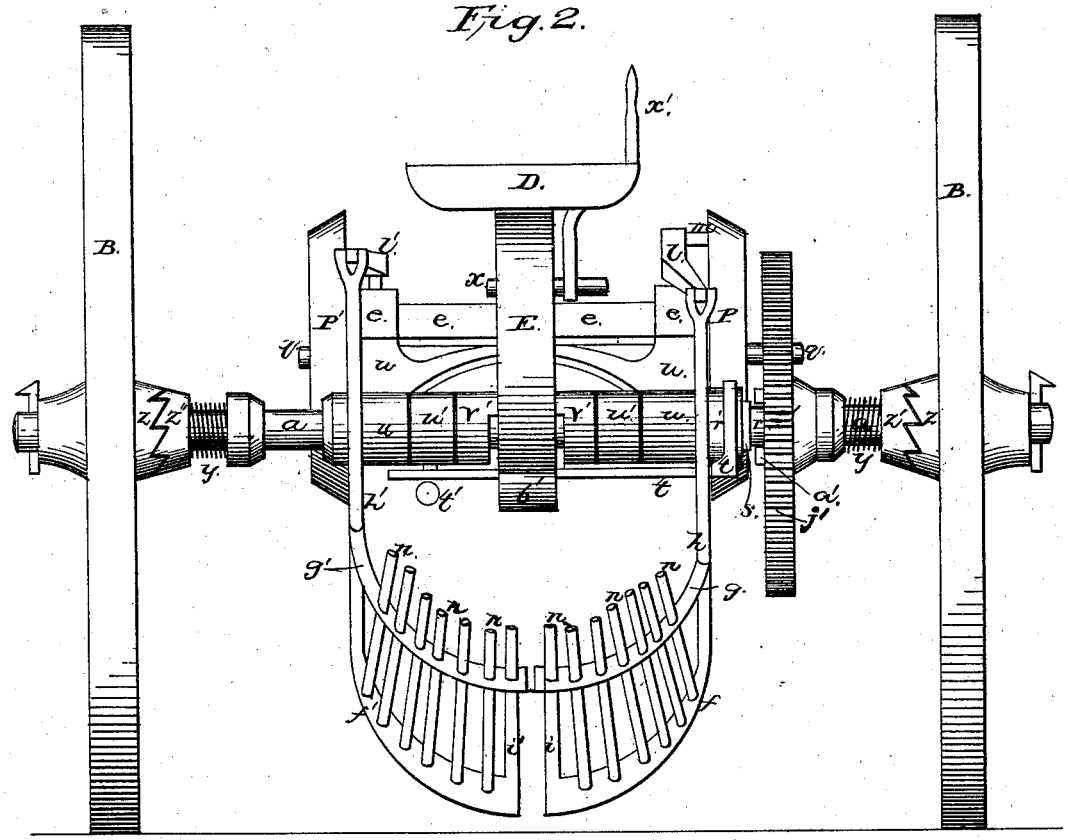

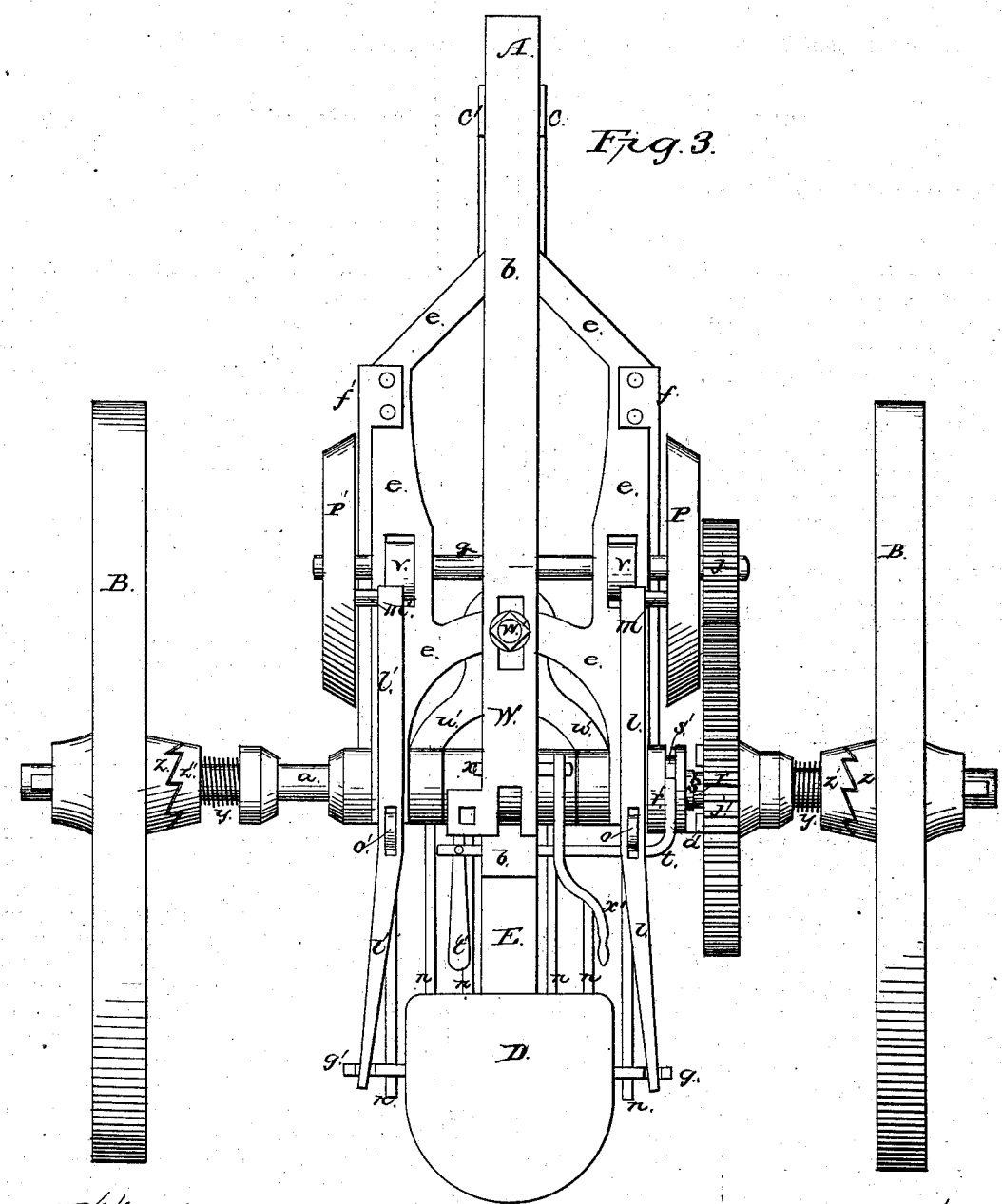

UNITED STATES PATENT OFFICE.

CYREL W. GREEN AND MARSHALL T. HOWLAND, OF RUTLAND, VERMONT.

IMPROVEMENT IN POTATO-DIGGERS.

Specification forming part of Letters Patent No. 207,175, dated August 20, 1878; application filed October 19, 1877.

*To all whom it may concern:*

Be it known that we, CYREL W. GREEN and MARSHALL T. HOWLAND, both of Rutland, in the county of Rutland and State of Vermont, have invented a new and useful Improvement in Potato-Diggers, which improvement is fully set forth in the following specification, reference being had to the accompanying drawings.

The object of our invention is to provide a potato-digging machine with a digger which will not clog up with vines, weeds, &c., when in operation.

Hitherto the great difficulty met with in producing a practical potato-digging machine of the class to which our invention is an improvement has been the clogging up of the digger with potato-vines, weeds, &c., thus throwing the machine from its work, and rendering it necessary for the operator to remove the troublesome matter with his hands and replace the machine upon its work. We have overcome this difficulty by forming the digger of two separate parts, having knives and loosely-attached rods, and giving to the rear end of each part an independent shaking motion by means of proper mechanism, as shown and described in the accompanying drawings.

Figure 1:
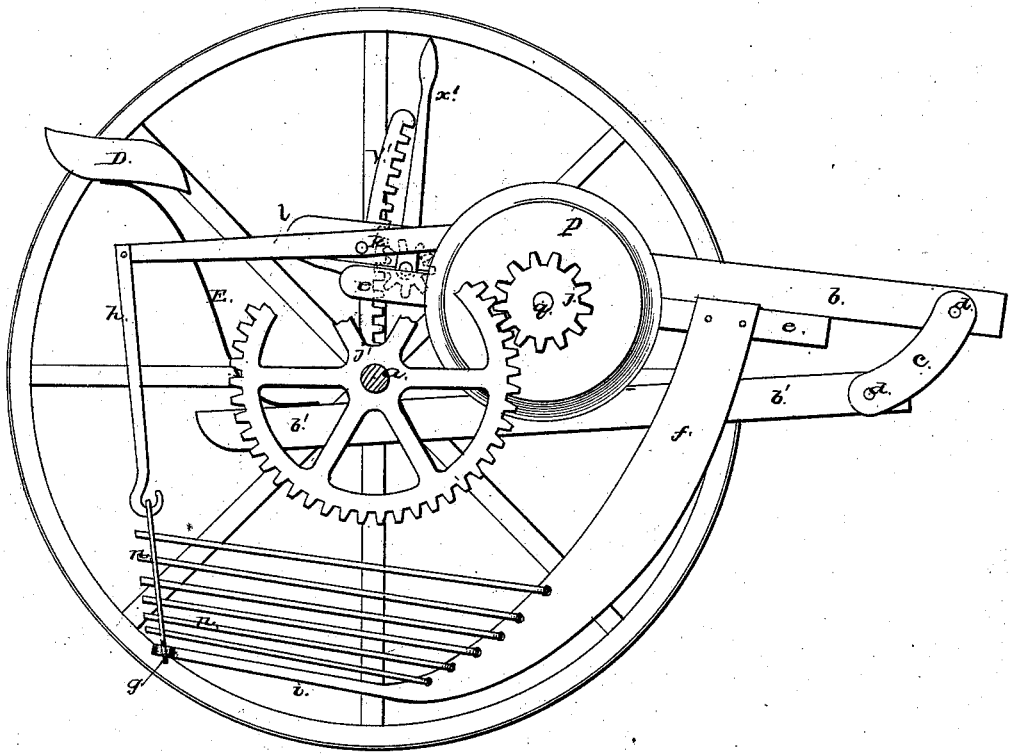
Figure 4:
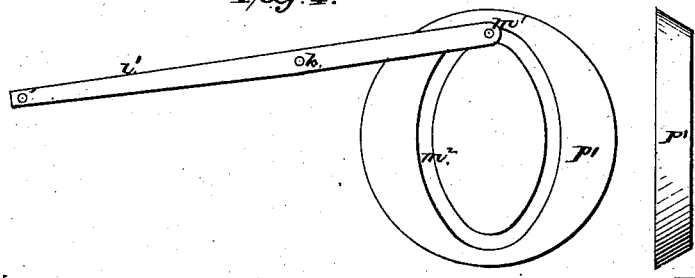

Our improvement is fully illustrated and described in detail, as follows:

Figure 1 represents a side view of the right side of the machine, with the right wheel and axle-tree up to the face of the cogged wheel $j'$ removed and a piece of the periphery of said wheel broken out, so as to better show the parts. Fig. 2 represents a rear-end view. Fig. 3 represents a top view. Fig. 4 represents the cam which gives motion to the parts of the digger.

A is the main pole or thill, to which the horse or horses are attached by any proper means. This pole or thill is composed of two parts, $b$ and $b'$, the part $b$ extending back a little beyond and above the axle-tree $a$, the part $b'$ also extending back beyond the said axle-tree and underneath the same, and being rigidly and securely attached to the piece $a'$, through which, at the rear end, the axle-tree passes. These two parts $b$ and $b'$ are attached loosely to each other, so as to admit of an up-and-down adjustment of the part $b$. They are attached by means of pieces of metal $c$ and $c'$ upon each side. These pieces are secured by bolts $d$ passing through the said pieces of metal and the said parts $b$ and $b'$, and being loosely adjusted. To the part $b$ the main frame $e$ of the machine is rigidly attached. To the forward end of the frame $e$ is attached rigidly, upon each side, the forward part or knives $f f'$ of the digger. These knives $f$ and $f'$ extend downward and backward. From the back of these knives, at their lower ends, there extend backward the two arms $i$ and $i'$. To the arms $i$ and $i'$ are loosely attached the pieces $g$ and $g'$, which are slightly curved and form the back end of the digger. The pieces $g$ and $g'$ are furnished with holes, through which the rods $n$ pass. These rods $n$ are loosely attached to the back edges of the knives $f$ and $f'$, and form the bottom of the digger. The pieces $g$ and $g'$ are loosely suspended on the rods $h$ and $h'$. The rods $h$ and $h'$ extend upward in rear of the axle-tree, and are loosely attached at their upper ends to the movable arms $l$ and $l'$. The arms $l$ and $l'$, at about their center, are attached loosely, and so as to admit of their up-and-down movement to parts $o$ and $o'$, which project from the main frame $e$, by means of the bolt $k$, passing loosely through both the parts $o$ and $o'$ and the arms $l$ and $l'$. The arms $l$ and $l'$ are provided at their forward ends with projections or pins $m$ and $m^1$ upon their outer sides. These pins $m$ and $m^1$ are adjusted to the cavity $m^2$ in the cam-wheels P and P$^1$. One of these cam-wheels is fully shown by Fig. 4 of the drawings. These cam-wheels are rigidly attached to the opposite ends of the shaft $q$, and are so adjusted with reference to the working of the cams that the forward end of one of the arms $l$ and $l'$ will be up while the other will be down. To the end of the shaft $q$, upon the right side of the machine, is rigidly attached the cogged wheel $j$. This cogged wheel $j$ works into the larger cogged wheel $j'$. The cogged wheel $j'$ is placed loosely upon the axle-tree $a$. This cogged wheel $j'$ is provided upon the inner side with a projection, $a'$. This projection is cut away upon opposite sides, over about one-fourth of its circumference on each side, as at $r$. The slide $r'$ is placed upon the axle-tree $a$, and is adjusted so as to revolve with the said axle-tree by means of a spline thereon, and is also adjusted so that it can receive a lateral movement when necessity requires. This slide is provided upon its outer end with projections, as at $s$. These projections are formed upon opposite sides of the slide, and are formed to fit into the cuts $r$ in the projection upon the cogged wheel $j'$. The slide $r'$ is provided with a groove, $s'$, around its central part, and into this groove is placed the curved rod $t$. This rod $t$ extends along back of the axle-tree, and is attached to a shifting bar or lever, $t'$.

Underneath the main frame $e$ is another and adjustable frame, $u$. The axle-tree $a$ passes loosely through the back ends of this frame. This frame extends forward, and its forward ends pass into the main frame $e$, as seen at $v$, Fig. 3, and hangs upon the shaft $q$. Upon the axle-tree $a$ is also hung loosely the slightly-curved rack-bar $v'$, which extends upward and through the rear end of the piece $b$ of the pole A, and upon the under side of the said piece $b$, and within the same, is placed a small cogged wheel adjusted to work into the said rack-bar $v'$. This cogged wheel is hung on the small arbor or shaft $x$, and to this is attached the lever $x'$. On the top of the piece $b$ is placed an adjustable slide, $w$, which is held in place by means of a screw or nut, $w'$. This slide is placed into the teeth of the rack-bar $v'$, as occasion may require, for the purpose of holding the frame $e$ and the parts attached thereto in the required position.

B B are wheels, which work loosely on the axle-tree $a$. The inner ends of the hubs of said wheels are provided with teeth $z$. Upon the axle-tree is placed the pieces $z^1$ and $z^2$, provided with teeth, which are adjusted to fit into the corresponding teeth on the hubs of the wheels. These pieces $z^1$ and $z^2$ are by means of a spline on the axle-tree, arranged to turn with the axle-tree, and to have a slight lateral movement when necessary. These pieces $z^1$ and $z^2$ are held up to their proper position by the use of the springs $y$. By this means the machine can be run back or turned around.

The seat D for the operator is attached to the back end of the piece $b'$ by the usual mode of attaching such seats, E being the support upon which it rests.

From the above description of the different mechanical parts of this machine it will be seen that when the machine is moved forward, the wheels revolving, the teeth upon the hubs will work into the teeth upon the pieces $z^1$ and $z^2$. This will cause the axle-tree $a$ to revolve, and consequently the slide $r'$. By throwing the slide $r'$ as far to the left as necessary to disconnect the projections upon the slide from the cuts $r$ on the cogged wheel $j'$, the machinery is put out of gear, and the machine can be drawn along without any of its parts working.

It will be further seen that by turning the lever $x'$ forward the shaft or arbor $x$ will turn, and the cogged wheel thereto attached will work into the rack-bar $v'$, and thus lower the main frame $e$, and also lower the digger; and by turning the lever $x'$ in the opposite direction, these parts will be raised.

It will be further seen that by throwing the slide $r'$ into gear with the cogged wheel $j'$ by throwing the lever $t$ to the right, the cogged wheel $j'$ will revolve and work into the cogged wheel $j$. This will cause the shaft $q$ and the cam-wheels P and P' to revolve also.

By the revolution of these cam-wheels the arms $l$ and $l'$ will impart a shaking motion to the rear end of the digger; and being adjusted on the arbor $q$, as previously described, one arm will be up at the time the other will be down, thus imparting to the digger, as it were, a vibrating shake. This motion, it is found in practice, is of very great importance and value in this class of potato-digging machines. By it the potatoes are more easily and quickly separated from the dirt, vines, weeds, &c. The vines and weeds are also, by means of this shaking motion, at once worked off from the digger and kept from clogging it up.

Further, the digger, being formed in two parts, takes up but few vines and weeds compared with the amount taken up by a digger formed in one part, while it more readily digs and separates the potatoes from the vines and weeds.

To put the machine in operation, it is only necessary to throw the slide $r'$ into gear with the cogged wheel $j'$ by means of the lever $t'$, and adjusting the frame $e$ and the digger in the proper position to work by means of the lever $x'$, and there securing it by the proper adjustment of the slide $w$.

We do not claim, broadly, a digger in a potato-digging machine composed of two separate parts, but confine our invention to the combination of parts set forth in the claims following.

Having thus fully described our invention and its operation, what we claim, and desire to secure by Letters Patent, is—

1. A digger in a potato-digging machine composed of two separate parts, said parts being composed of the knives $f$ and $f'$, having the arms $i$ and $i'$, to which are loosely attached the pieces $g$ and $g'$, said pieces $g$ and $g'$ being provided with a mechanism for imparting thereto an alternate up-and-down shaking motion, and the rods $n$ loosely attached to the knives $f$ and $f'$ and to the pieces $g$ and $g'$, substantially as described, and for the purposes specified.

2. The combination, in a potato-digging machine, of the knives $f$ and $f'$, having arms $i$ and $i'$, the pieces $g$ and $g'$ loosely connected to the arms $i$ and $i'$, having the rods $n$, which are attached to the knives, the rods $h$ and $h'$, the arms $l$ and $l'$, the frame $e$ of the machine, the cam-wheels P and P', the shaft $q$, the cogged wheels $j$ and $j'$, the slide $r'$, and the axle-tree $a$, all combined and working substantially as and for the purposes specified.

CYREL W. GREEN.
MARSHALL T. HOWLAND.

Witnesses:
HENRY H. SMITH,
FRANK C. ROBBINS.